United States Patent [19]
Fukai

[11] Patent Number: 5,232,715
[45] Date of Patent: Aug. 3, 1993

[54] APPARATUS FOR COOLING A PREFORM IN A COOLING TUBE

[75] Inventor: Hidehiko Fukai, Komoro, Japan
[73] Assignee: Nissei ASB Machine Co., Ltd., Japan
[21] Appl. No.: 924,462
[22] Filed: Aug. 3, 1992

Related U.S. Application Data

[62] Division of Ser. No. 775,275, Oct. 11, 1991, Pat. No. 5,176,871.

[30] Foreign Application Priority Data

Oct. 15, 1990 [JP] Japan .................. 2-275841

[51] Int. Cl.⁵ .................. B29C 45/72; B29C 49/64
[52] U.S. Cl. .................. 425/526; 425/548
[58] Field of Search .............. 264/237, 348, 520, 537, 264/327, 328.14, 538; 425/526, 533, 534, 547, 548, 404, 445; 34/7, 20, 34, 104

[56] References Cited

U.S. PATENT DOCUMENTS

| | | | |
|---|---|---|---|
| 4,180,379 | 12/1979 | Rainville | 425/526 |
| 4,416,608 | 11/1983 | Deardurff | 425/548 |
| 4,449,913 | 5/1984 | Krishnakumar et al. | 264/328.14 X |
| 4,571,173 | 2/1986 | Chang et al. | 425/526 X |
| 4,592,719 | 6/1986 | Bellehache et al. | 425/534 X |
| 4,818,213 | 4/1989 | Roy | 425/533 |

FOREIGN PATENT DOCUMENTS

| | | |
|---|---|---|
| 0058947 | 9/1982 | European Pat. Off. |
| 3335334 | 4/1985 | Fed. Rep. of Germany. |
| 61-120723 | 6/1986 | Japan. |
| 61-185429 | 8/1986 | Japan .................. 425/526 |
| 1495781 | 12/1977 | United Kingdom. |

Primary Examiner—Richard L. Chiesa
Attorney, Agent, or Firm—Ostrolenk, Faber, Gerb & Soffen

[57] ABSTRACT

An apparatus of cooling and solidifying a preform involves introducing a preform in a heated state released from an injection mold into a cooling tube having a bottom opening and an upper opening through which cooling air flows from said bottom opening to said upper opening, said bottom opening being provided with a fan for cooling air, and inserting a cooling core into the preform to place the cooling core in close contact therewith, the preform being forcibly cooled from interior and exterior thereof by cooling air flowing in a turning state between the preform and the cooling tube and a coolant supplied to said cooling core.

4 Claims, 2 Drawing Sheets

APPARATUS FOR COOLING A PREFORM IN A COOLING TUBE

This is a division of application Ser. No. 07/775,275, filed Oct. 11, 1991, now U.S. Pat. No. 5,176,871.

BACKGROUND OF THE INVENTION

(1) Field of the Invention

This invention relates to a method and apparatus for cooling a preform, in which an injection molded preform is released from an injection mold while the preform is in a heated state, and the preform is then transferred to the other area to cool and solidify it.

(2) Prior Art

In molding of a bottle in which an injection molded preform is cooled and solidified, and the preform is then re-heated later to orientation blow mold it into a bottle-like container, a large amount of preforms are required. Therefore, when a preform is cooled and solidified by the injection mold as in conventional injection molding, it takes time for cooling, resulting in a very poor productivity. It has been desired therefore that cooling time is shortened by some means to shorten a molding cycle and improve the productivity of the preform process.

One means has been proposed on the basis of the fact that there is state where although the interior is in a molten state, the shape of the preform is maintained by a skin layer formed on the surface, and the preform can be released in such a state and immediately transferred to a cooling device at the another position for forced cooling, whereby cooling time of the preform is shortened.

As the cooling means after release, quenching using a refrigerator or contacting with a cooling tube set to a low temperature have been employed.

The cooling by way of a refrigerator poses a problem in that the preform is materially contracted by cooling and this impairs the molding accuracy. On the other hand, in the cooling by way of contact, since the contact with the cooling tube is effected by pressure of air blown into the preform, the wall thickness of the preform becomes thinner than the desired dimension.

The contraction and formation of thinner wall thickness of the preform during the process of cooling do not occur uniformly but the location thereof differs with the injection molding state of the preform. These locations give rise to unevenness of temperature of the preform after being reheated, making it technically difficult to perform orientation blow molding of the preform into a container.

SUMMARY OF THE INVENTION

This invention has been achieved in order to solve the aforementioned conventional problems. It is an object of this invention to provide a new method capable of performing cooling in a short time without bringing forth a change in thickness and shape of the preform and an apparatus capable of adjusting the flow rate of cooling air.

For achieving the aforesaid object, a method of cooling a preform according to this invention comprises introducing a preform in a heated state released from an injection mold into a cooling tube having a bottom opening and an upper opening through which cooling air flows from said bottom opening to said upper opening, said bottom opening being provided with turning means for cooling air, and inserting a cooling core into the preform to place said cooling core in close contact therewith, said preform being forcibly cooled from the interior and exterior thereof by cooling air flowing in a turning state between said preform and said cooling tube and a coolant supplied to said cooling core.

Further, an apparatus of cooling a preform according to this invention comprises a cooling tube in which both bottom and upper portions are opened, said bottom opening being located at an opening portion of a cooling chamber, and a cooling core disposed movably up and down at the upper portion of said cooling tube, said cooling tube being provided with turning means for cooling air in which upper and two fixed fans are connected by a threaded shaft within the bottom, said fixed fans being mounted on the side of the cooling tube so that the upper fixed fan is moved up and down by rotation of the central threaded shaft to regulate flow rate of cooling air.

Furthermore, an apparatus for cooling a preform according to this invention is characterized in that an inner wall surface of a bottom of a cooling tube is formed to have a tapered surface which is wider toward an opening, a guide member for cooling air whose outer periphery has the same tapered surface as said inner wall surface and formed in its upper surface with a recess is provided in a central portion of the upper fixed fan, and the flow rate of cooling air can be regulated by a change in spacing with a relative positional change between two tapered surfaces caused by upward and downward movement of said fixed fan.

With the aforementioned arrangement, the preform is cooled from the interior thereof by the cooling core inserted into and placed in close contact with the preform, and contraction of the preform resulting from cooling by the cooling core is prevented.

The preform is also cooled from the exterior thereof by cooling air which flows around the exterior, and the preform is cooled to a predetermined temperature in a short time and solidified by said both internal and external cooling. Moreover, the cooling air is turned between the preform and the cooling tube by the fixed fan at the bottom opening and flows out toward the upper opening, and therefore, cooling of the side of the preform is uniformly carried out.

With the aforementioned arrangement, a plurality of preforms can be simultaneously cooled in a short period of time without occurrence of one-sided wall thickness variations and deformation. In addition, since the molding accuracy is maintained even after cooling, orientation blow molding after reheating becomes easier to thereby loss of moldings and further to improve the productivity.

Furthermore, it will suffice that the cooling tube having a fan mounted on the bottom opening is provided on the opening portion of the cooling chamber, and the cooling core is disposed movably up and down at the upper portion of the cooling tube. The apparatus is simple. Cooling air is merely supplied into the cooling tube from the cooling chamber without requiring special adjustment.

The present invention will be described in detail by way of an embodiment shown in the drawings.

BRIEF DESCRIPTION OF THE DRAWINGS

The drawings schematically show one embodiment capable of performing a method of cooling a preform according to this invention.

DETAILED DESCRIPTION OF PREFERRED EMBODIMENT

Figure 1:
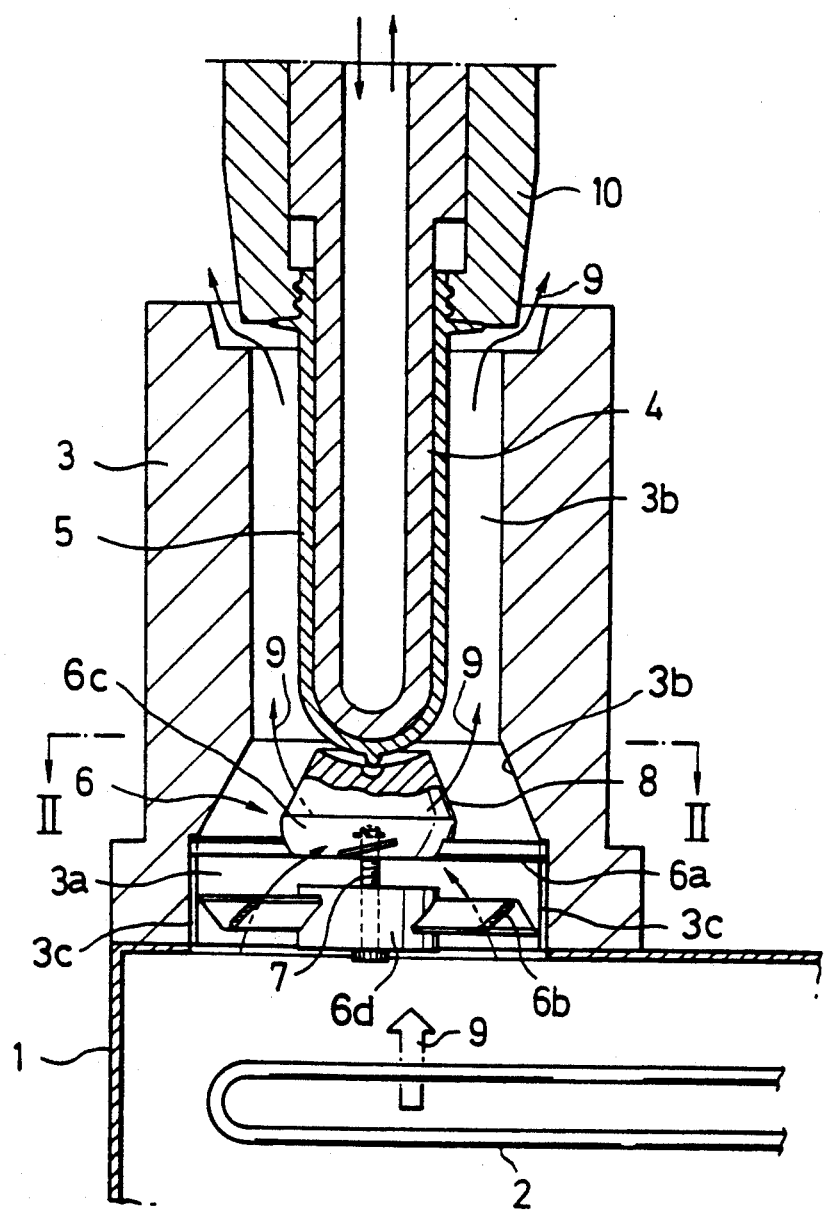
FIG. 1 is a longitudinal sectional view.
Figure 2:
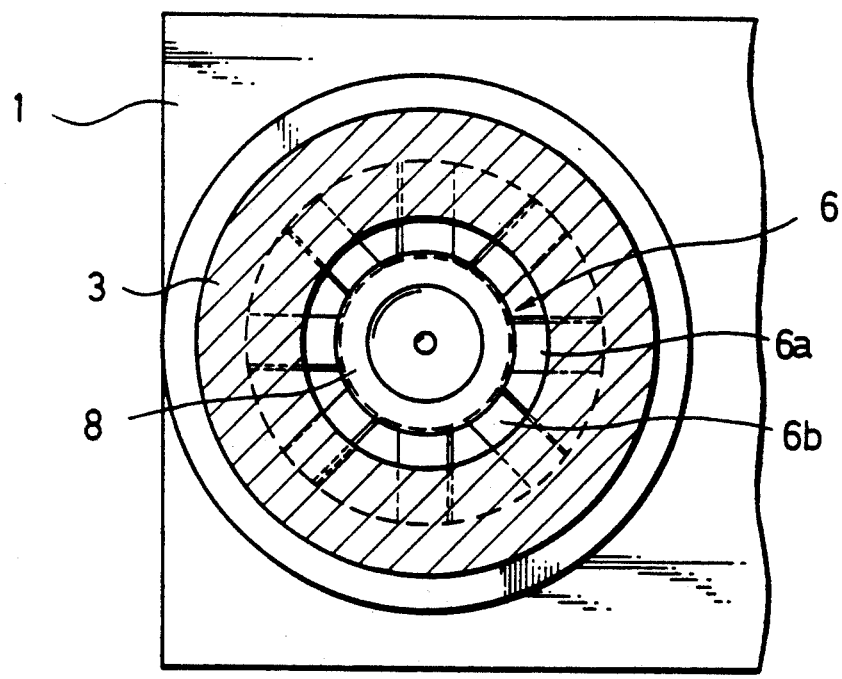
FIG. 2 is a sectional view taken on line II—II of FIG. 1.

In the drawings, reference numeral 1 designates a cooling chamber, 2 a cooling pipe therein, 3 a cooling tube having a bottom portion secured to an opening of the cooling chamber 1, 4 a cooling core into which a coolant is supplied, and 5 a closed-end preform formed of polyethyleneterephthalate or the like subjected to injection molding.

The cooling tube 3 has an inside diameter larger than the preform 5. An upper portion and a bottom portion of the cooling tube 3 are opened, and an inner wall surface 3b at the bottom portion 3a thereof is formed to have a tapered surface which is wider toward the opening side. A cooling air turning means 6 is mounted from the bottom portion 3b to the opening 3a.

The turning means 6 has upper and lower fixed fans 6a and 6b connected by a threaded shaft 7. The fans are fixed in the sense that their blades do not constantly rotate. The fixed fans 6a and 6a are provided with blades inclined at a predetermined angle at four corners of cores 6c and 6d and integrally connected by the threaded shaft 7 provided over the cores 6c and 6d.

On the core of the upper fixed fan 6a is integrally provided a frustoconical guide member 8 having an outer peripheral portion formed to have the same tapered surface as the inner wall surface 3b and an upper surface formed into a recess in the form of a concave curve along the the bottom surface of the preform. The guide member 8 guides cooling air from the bottom opening to the peripheral portion of the preform and protects the bottom surface of the preform from cooling air.

In the turning means 6 composed of the upper and lower fixed fans 6a and 6b as described above, the lower fixed fan 6b is secured to the cooling tube so that the upper fixed fan 6a is moved up and down together with the guide member along the guide groove 3c on the cooling tube side by the rotation of the threaded shaft 7 and provided within the bottom, whereby cooling air 9 from the cooling chamber 1 flows into the upper opening 3b in the turning state within the cooling tube.

Cooling of the preform 5 by the aforementioned apparatus will be described hereinbelow.

The preform 5 in the aforementioned state released from an injection mold (not shown) is transferred upwardly of the cooling tube 3 with a neck portion thereof held on a neck mold 10. When the preform 5 assumes a position above the cooling tube as the transfer means stops, the preform 5 moves down together with the neck mold 10, and the bottom surface thereof is inserted into the cooling tube till it comes close to the guide member 8 and a portion lower than the neck portion is introduced into the cooling tube.

The cooling core 4, which is slightly smaller in outside diameter than inside diameter of a preform and through which coolant flows, is inserted into the preform through the neck mold 10.

In insertion of the cooling core 4, cooling air has been already fed from the cooling chamber 1 into the cooling tube at a predetermined flow velocity. A flow of cooling air is turned into a turning flow by inclination of blades provided on the upper and lower fixed fans 6a and 6b, during passage through the latter, and flows into the cooling tube. For this reason, the preform 4 is cooled from interior and exterior thereof by both coolant of the cooling core and the cooling air, and slight contract of the preform 5 caused by the cooling causes the inner wall surface of the preform 5 to contact with the cooling core 4.

Thereby, the preform 5 is prevented from contraction due to further cooling to prevent the loss of molding accuracy of the preform 5 caused by the contraction.

The cooling air 9 entered the cooling tube 3 flows into the upper opening 3b while turning along the cooling tube 3 avoiding the bottom surface of the preform 5 covered by the guide member 8. For this reason, the bottom surface is not excessively cooled but cooling from the exterior is applied uniformly to the preform 5 and a difference in contraction resulting from unevenness of cooling is hard to occur.

The adjustment of flow rate of the cooling air 9 is easily carried out by changing the spacing due to a relative positional change between the two tapered surfaces as a result of upward and downward movement of the upper fixed fan 6a caused by the rotation of the threaded shaft 7. Therefore, cooling according to the design of the preform 5 can be always carried out.

The above-described embodiment, a single cooling tube has been used. However, a plurality of cooling tubes can be similarly provided in the cooling chamber and at the same time a plurality of preforms can be cooled and processed by similar means. Therefore, this invention is not limited to cooling of a single preform.

What is claimed is:

1. An apparatus for cooling a preform comprising: a cooling tube of which both bottom and upper portions are opened, said bottom opening of said cooling tube being located at an opening portion of a cooling chamber, and a cooling core disposed movably up and down at the upper portion of said cooling tube, said cooling tube being provided with turning means for cooling air in which upper and lower fans are connected by a threaded shaft within the bottom portion, said fans being mounted on the side of the cooling tube so that the upper fan is moved up and down by rotation of the central threaded shaft to regulate flow rate of cooling air.

2. An apparatus for cooling a preform according to claim 1, wherein an inner wall surface of said bottom portion of said cooling tube is formed to have a tapered surface which is wider toward said bottom opening, a guide member for cooling air of which outer periphery has the same tapered surface as said inner wall surface and formed in its upper surface with a recess is provided in a central portion of the upper fan, and the flow rate of cooling air can be regulated by a change in spacing with a relative positional change between said two tapered surfaces caused by upward and downward movement of said fan.

3. An apparatus for cooling a preform comprising a cooling tube having first and second openings through which cooling air can flow into and out of the tube, said first opening having a frustoconical cross section, a guide surface adjacent to the first opening whereby the amount of cooling air impinging on a preform positioned adjacent the guide surface can be regulated and disposed within said frustoconical cross section of the first opening and having a corresponding frustoconical cross section, air flow means disposed adjacent the first opening for causing cooling air to flow into said cooling tube, and a cooling core disposed inside said cooling tube and movable between first and second positions therein, wherein the air flow means comprises a first fan at a fixed position and a second fan movable between first and second positions, and in which the distance between the air flow means and the guide surface is adjustable by moving the second fan.

4. An apparatus according to claim 3 in which the fixed and movable fan are connected by a threaded shaft.

* * * * *